United States Patent [19]
Swenson et al.

[11] 3,951,373
[45] Apr. 20, 1976

[54] VEHICLE SEAT HAVING VALVE CONTROLLED AIR SPRING

[75] Inventors: Richard F. Swenson; Shawn H. Eimen, both of Milwaukee, Wis.

[73] Assignee: Milsco Manufacturing Company, Milwaukee, Wis.

[22] Filed: Feb. 18, 1975

[21] Appl. No.: 550,418

[52] U.S. Cl. .............................. 248/400; 248/157
[51] Int. Cl.[2] ........................................ A45D 19/04
[58] Field of Search .......... 248/399, 400, 401, 372; 267/650, 131, DIG. 1; 91/387; 248/157, 421

[56] References Cited
UNITED STATES PATENTS

| | | | |
|---|---|---|---|
| 3,325,136 | 6/1967 | Radke et al. ....................... | 248/400 |
| 3,599,232 | 8/1971 | Tabor ................................. | 248/400 |
| 3,727,974 | 4/1973 | Swenson et al. .................... | 248/399 |
| 3,765,639 | 10/1973 | Mystrom ............................. | 248/399 |
| 3,814,370 | 6/1974 | Havrwitz ............................. | 248/400 |

*Primary Examiner*—William H. Schultz
*Assistant Examiner*—Robert A. Hafer
*Attorney, Agent, or Firm*—James E. Nilles

[57] ABSTRACT

An adjustable seat suspension system for a vehicle seat for a tractor, earth working equipment, or the like, and in which the seat is resiliently supported by a pressurizable air bag. The seat suspension system provides a manually settable lever by means of which the operator can infinitely vary the height adjustment of the seat for a normal operating position, depending on his size. The seat suspension adjusting mechanism includes a valve for regulating the flow of pressurized air to or from the air bag. The arrangement is such that for any vertical height position selected by the operator, the air controlling mechanism permits the seat to oscillate up and down through a given range of movement, say for example six and one-half inches. In addition to a normal operating oscillation range for any selected height adjustment, the seat suspension control system of the present invention includes a floating pivot point in the control linkage which can shift from its normal operating position to thereby in effect disconnect the control valve and protect it when the seat movement exceeds the limits of the valve spool, which limits are small compared to overall linkage movement requirements.

10 Claims, 11 Drawing Figures

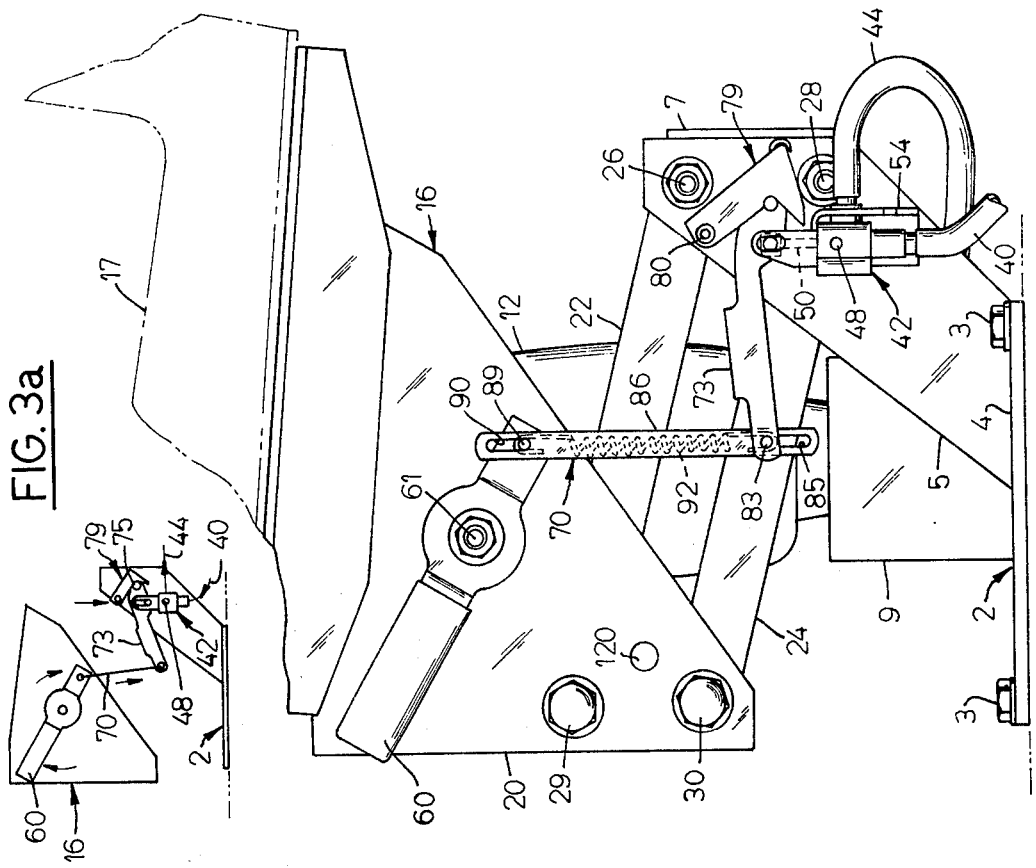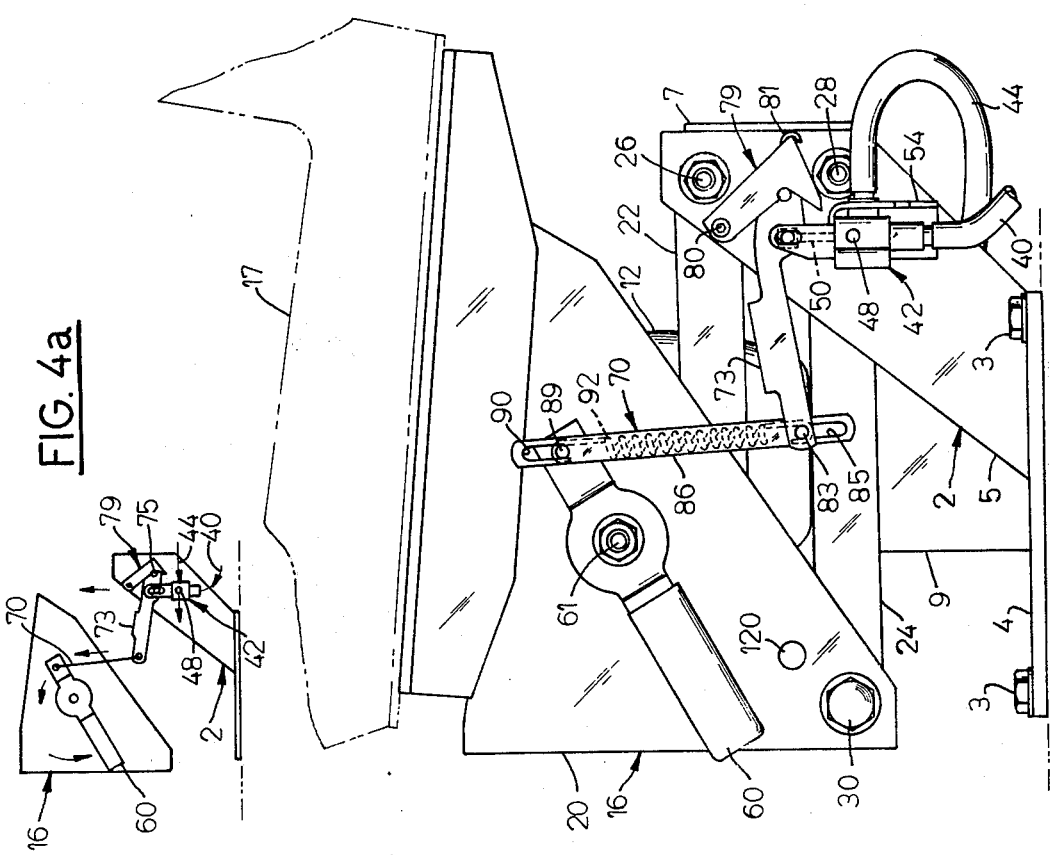

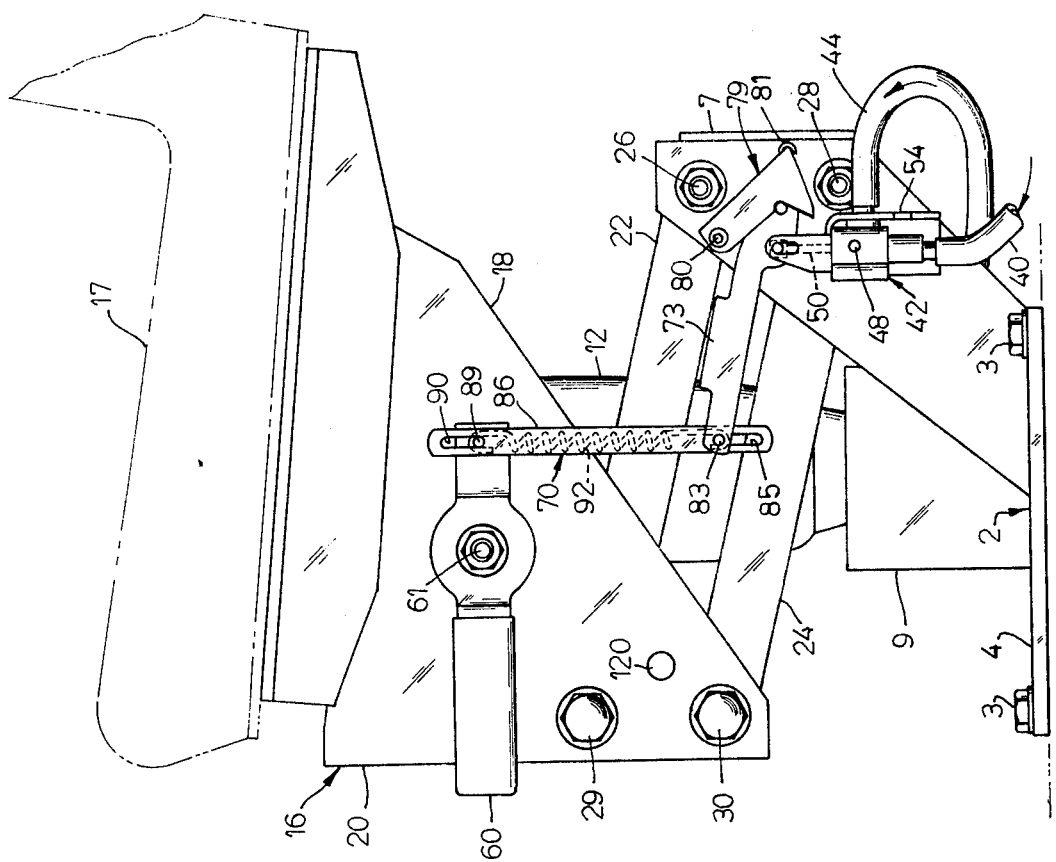
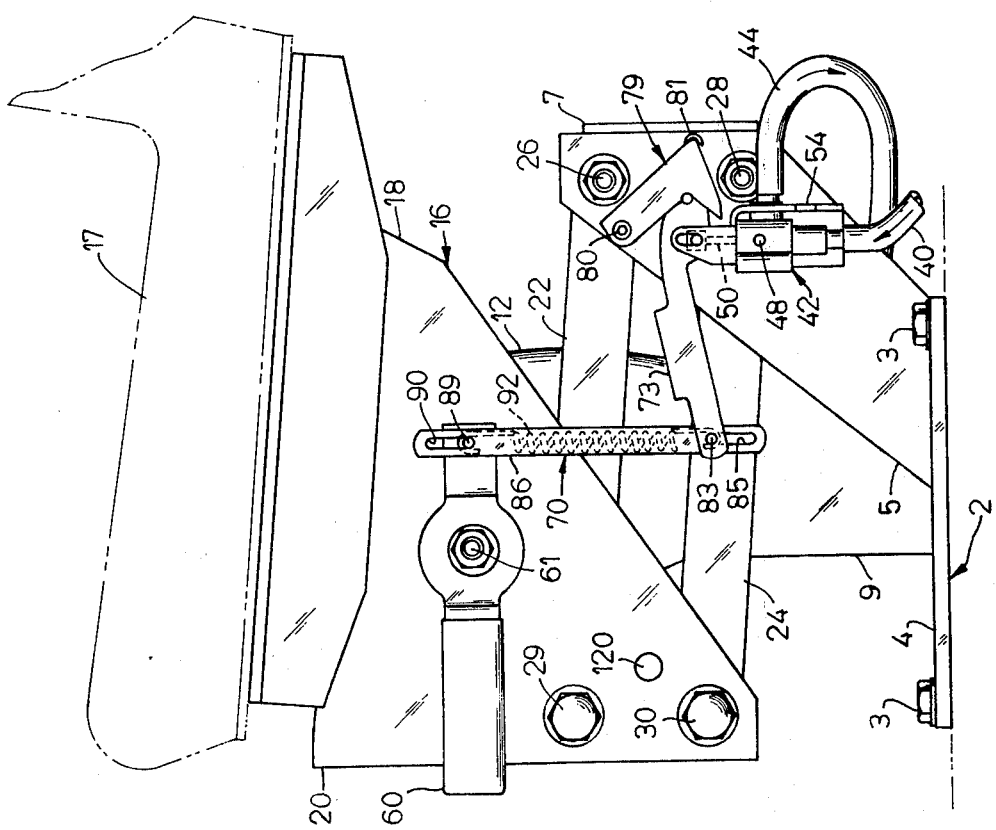

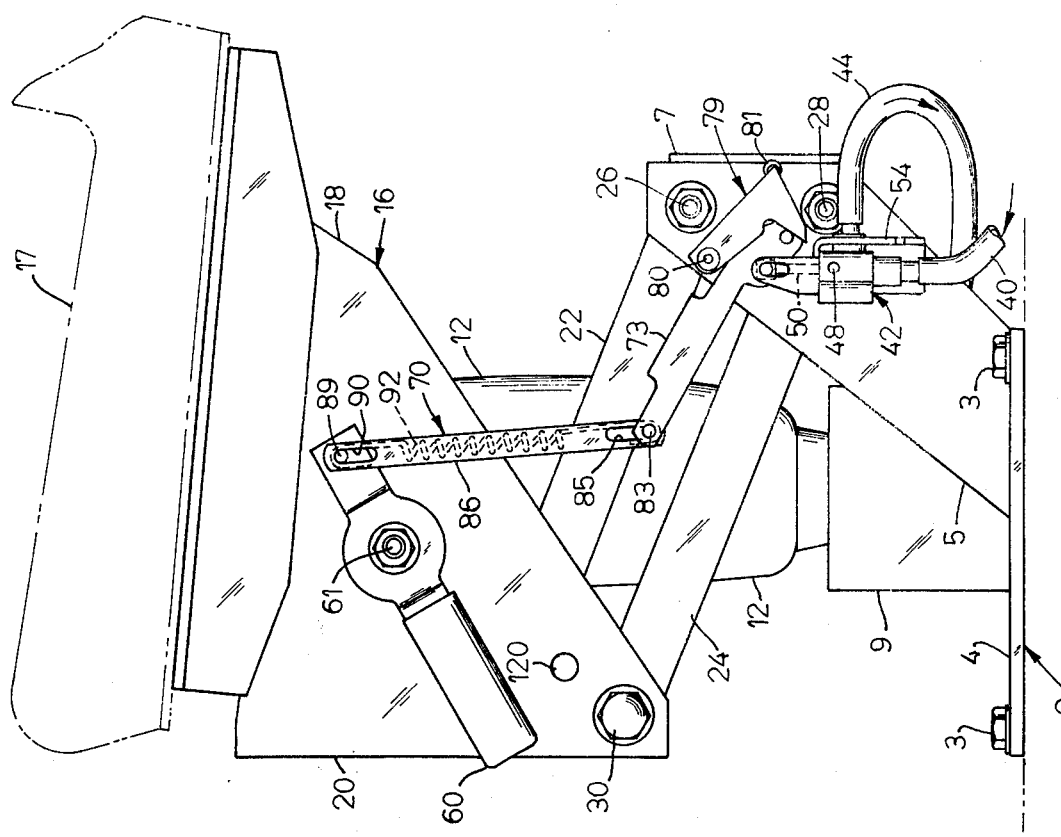

3,951,373

VEHICLE SEAT HAVING VALVE CONTROLLED AIR SPRING

BACKGROUND OF THE INVENTION

The present invention pertains to adjustable seat suspension systems having air bar suspensions for resiliently supporting the seat in any adjusted position and wherein control means are provided for the air bag to control the amount of flow of air admitted to or exhausted from the air bag. Many of these prior art devices have been proposed and used with a considerable amount of success, but some of them are extremely complicated as to the number of parts involved and as to their adjustabilities and settings. Other of these prior art devices did not provide a sufficiently wide range of seat adjustments for various sized operators, but instead provided only definite, fixed height settings. Seat suspension controlling devices of the kind to which the present invention is directed must be easy and foolproof in operation and not subject to malfunction of its parts.

One example of prior art devices of the general type to which the present invention relates is shown in the U.S. Pat. No. 3,325,136 which issued June 13, 1967 to A. O. Radke entitled "Seat Suspension."

SUMMARY OF THE PRESENT INVENTION

The present invention provides a seat suspension system that is capable of providing an infinite number of vertical height adjustments of the seat to accommodate operators of any size and weight. For any height setting selected by the operator, the control system of the present invention provides a range of vertical oscillation of the seat, from the normal ride position which is selected. In addition, the control mechanism provided for the seat suspension system insures that the control valve which directs the flow of air to and from the air bag is protected even though the system is subjected to violent and unusual extremes of movement in either the upper or downward position. The above features are accomplished by a control linkage between the valve and the vertically adjustable handle and seat mounting and which has a floating pivot point that can shift from its normal operating centered position when the seat has moved to either an extreme up or down position.

The above seat suspension and control mechanism provided by the present invention is relatively simple in construction, operation, and maintenance.

These and other objects and advantages of the present invention will appear hereinafter as this disclosure progresses reference being had to the accompanying drawings.

BRIEF DESCRIPTION OF THE DRAWINGS

FIGS. 3a and 3, 4a and 4 are side elevational views, some in schematic form, and showing the action of the height adjustment feature.

FIG. 3a is a schematic view of the mechanism as shown in FIG. 1 but showing the position of the handle immediately after it has been shifted to the upper position which will cause the seat to be elevated;

FIG. 3 is a side elevational view similar to the FIG. 3a illustration and showing the position of the seat after it has been raised by the air bag due to the upper swinging movement of the handle;

FIG. 4a is a schematic view of the device as shown in FIG. 1 but showing the position of the handle at the moment it has been swung downwardly to a seat lowering position, but before the seat has been lowered;

FIG. 4 is a side elevational view of the seat suspension system and showing the seat after it has been lowered due to dumping of the air from the air bag which was caused by swinging the handle to the downward position;

FIGS. 5 and 6 are side elevational views showing the seat suspension setting in the mid-ride position and showing the normal operating oscillating movement of the seat in the mid-ride position;

FIG. 5 is a side elevational view of the seat suspension mechanism showing the mechanism when set in the mid-ride position, but showing the seat when it has bounced downwardly to actuate the valve to permit air to go to the bag to cushion the downward movement;

FIG. 6 is a side elevational view of the seat suspension mechanism with the handle in the mid-ride position but showing the seat when it has bounced to the upper position, causing the control valve to be shifted upwardly to permit air to flow from the air bag thereby cushioning the bouncing movement in the upward direction;

FIGS. 7 and 8 are side elevational view of the seat suspension system and illustrating the maximum up and down travel of the seat suspension system and the valve protection feature in either of the extreme positions and which is provided by the floating pivot point in the valve actuating mechanism;

FIG. 7 is a side elevational view of the seat suspension system showing the mechanism handle in the maximum down-position, but showing the seat in the uppermost position, for example, when a heavy man who had the handle setting on the extreme low position suddenly removed himself from the seat, and showing how the valve has been shifted to the upper position to permit increased air pressure to exhaust from the bag and showing the floating pivot point of the mechanism when it travels out of the normal operating, center notch;

FIG. 8 is a side elevational view of the seat mechanism showing the position of the seat in the maximum down position, as for example when the air is turned off and there is no air in the system and the floating pivot point of the mechanism has moved upwardly and out of the normal operating, center notch of the mechanism, thereby protecting the valve;

DESCRIPTION OF A PREFERRED EMBODIMENT

Figure 2:
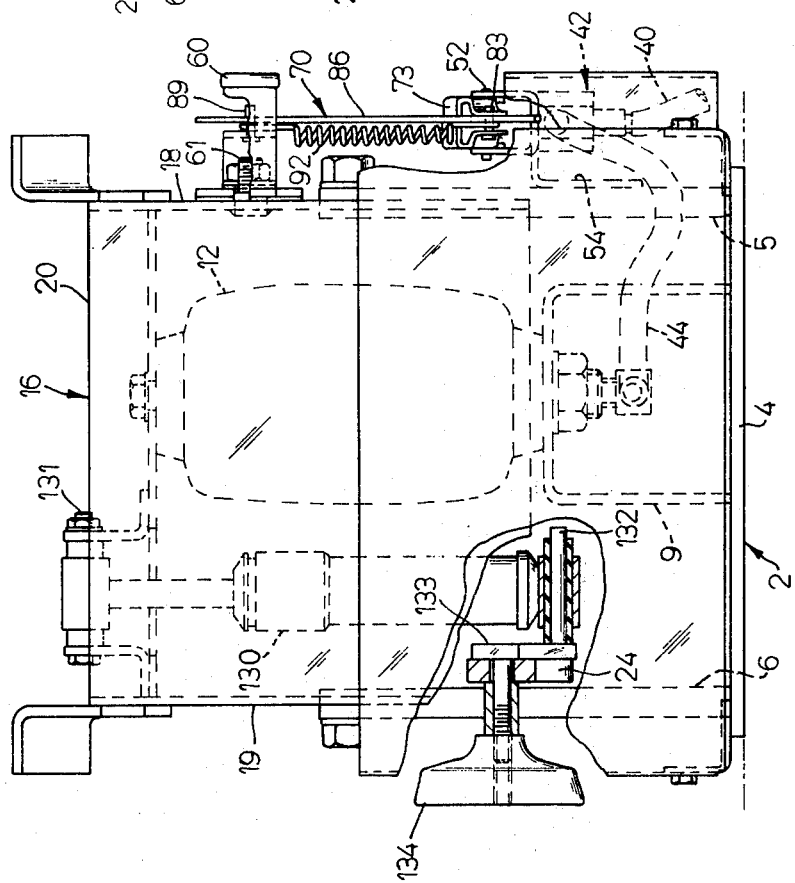
FIG. 2 is a front elevational view of the seat suspension shown in FIG. 1, certain parts being shown as broken away or in section for the sake of clarity.

The general organization of the present invention includes a base frame 2 which can be secured by bolt means 3 to a vehicle such as a tractor, not shown, or other vehicles. The present invention finds particular utility when used with vehicles that are operated over rough and uneven terrain which consequently causes the operator to be subjected to a rough ride. The base frame 2 includes a base 4 to which are welded a pair of laterally spaced and upwardly extending plate members 5 and 6 (FIG. 2). Members 5 and 6 are rigidly connected together by a rear plate 7 which is welded to the plate members 5 and 6. The base frame also includes an air spring platform 9 welded thereto and which supports the lower end of an air bag spring 12, commonly known as a fluid spring or an air bag. The seat suspension system includes a seat frame generally designated as numeral 16 and on which a seat 17 is adjustably mounted in a fore and aft direction by means not pertinent to the present invention. The seat frame 16 is comprised of a generally U-shaped member having fore and aft extending walls 18 and 19 (FIG. 2) and a front, transverse wall 20 formed integrally therewith.

The seat frame is vertically mounted relative to the base frame by two pairs of parallel arms, such as the pair of laterally spaced, upper arms 22 and a pair of lower, laterally spaced arms 24. These arms are pivotally mounted at their rear ends to the base frame by the bolt and shaft means 26 and 28, respectively, and are pivotally mounted at their front ends to the seat frame by the shaft and bolt means 29 and 30, respectively. Thus, the seat can be vertically positioned relative to the base by means of the parallel arm arrangement and be maintained at a constant attitude to the base regardless of the height of the seat in the known manner.

The air spring 12 is mounted at its upper end to the plate 30 which extends between and is welded to the interior surfaces of the side walls 18 and 19 of the seat frame.

Figure 9:
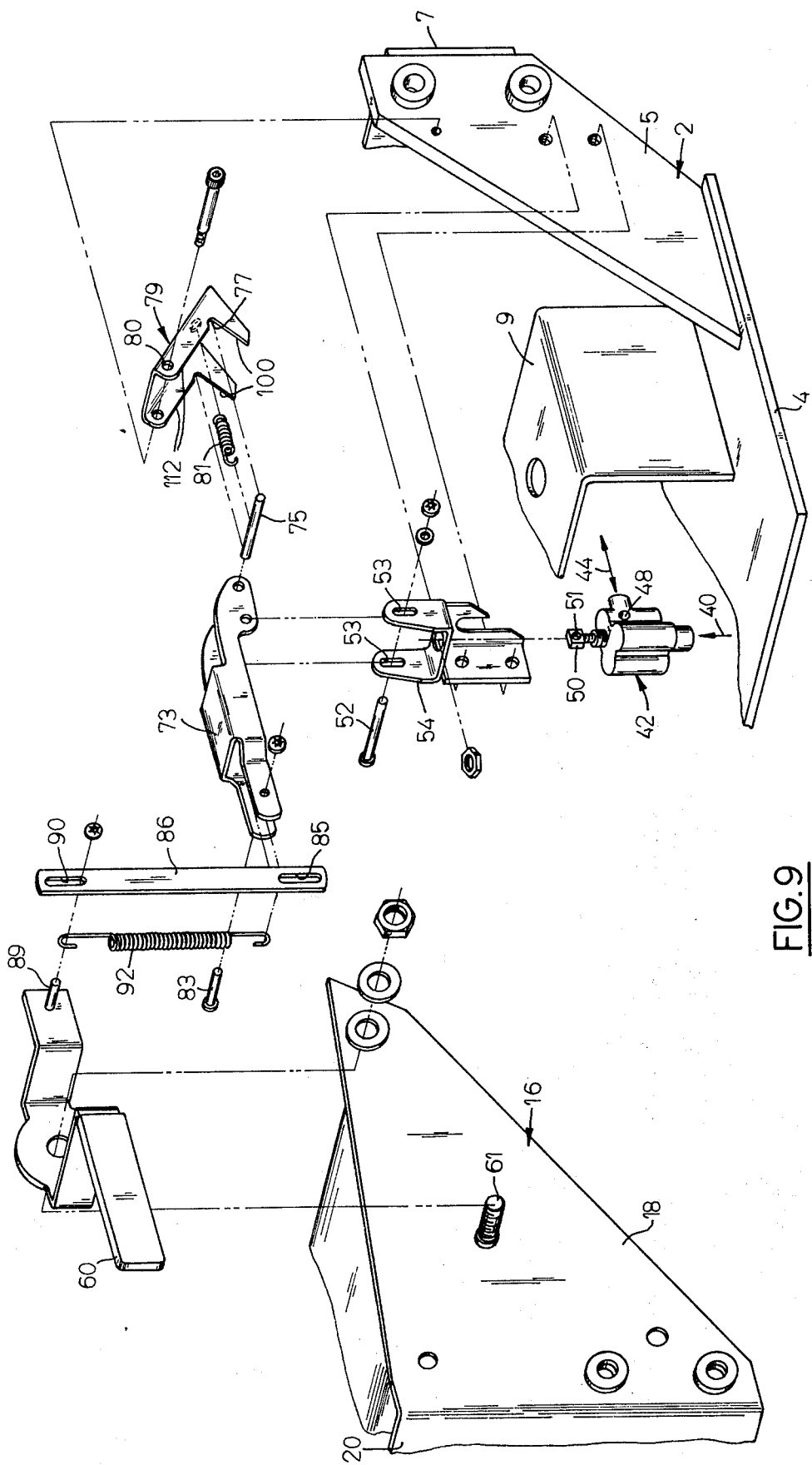
FIG. 9 is a perspective, exploded, fragmentary view of the adjustable seat suspension system.

A source of air pressure (not shown) provides air pressure via a conduit 40 to an air valve 42 that is mounted on the base frame. Another conduit 44 extends from the air valve 42 and places the air valve in communication with the air bag. As will appear, the air valve 42 acts to regulate the admission of air pressure to the air bag or the exhaust of air pressure from the air bag. The valve 42 includes an exhaust port 48 in its side and from which air pressure can be exhausted to atmosphere. The air valve includes a vertically shiftable valve element 50 which extends upwardly from and out of the body of the air valve and the element has an opening 51 (FIG. 9) at its upper end for the reception of a pin 52 that slides in slots 53 of a guide 54.

The valve 42 itself is of conventional character and may be of the type made by Williams Air Controls of Portland, Oregon. More specifically, this seat control valve which is used for trapped air type pneumatic seats may be of the type known as Model No. WM 397. In the normal position of the valve, the outlet port is sealed off and furthermore air pressure cannot enter the valve from the supply conduit 40. It is believed sufficient to say that when the valve element 50 is shifted upwardly by the control mechanism to be described, pressurized air which has entered conduit 44 is permitted to leave the exhaust port 48, thereby exhausting air from the air bag, such a situation being shown in FIG. 4a and will be further described. When the air valve is shifted downwardly as indicated schematically in FIG. 3a, the air pressure from the supply conduit 40 is directed to the air bag via the conduit 44.

Seat Height Adjustment

Figure 1:
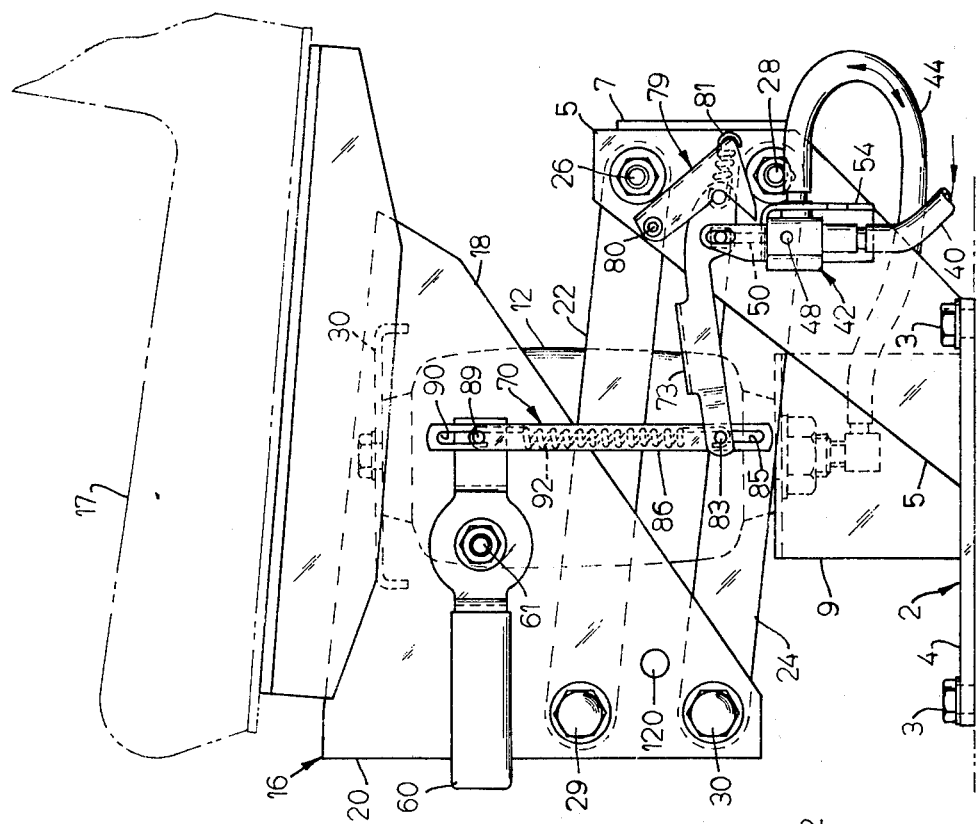
FIG. 1 is a side elevational view of a seat suspension embodying the present invention, certain parts being shown as broken away or removed for the sake of clarity and showing the mechanism set in the mid-ride position.

A manually operable handle 60 is pivoted to the seat frame at 61 and extends forwardly therefrom where it is within easy grasp of the operator seated on the seat 17. This handle 60 can be swung either upwardly or downwardly from the mid-ride position shown in FIG. 1 so as to provide an infinite number of settings of height of the seat depending on the operator's choice. In the mid-ride static position of the seat, the valve 42 is in the neutral or normal position with no air pressure being admitted into the valve and the air bag is blocked off from the air pressure supply. The handle 60 can be adjusted in either an up or down direction to cause the seat to be correspondingly raised to lowered, depending on the position selected by the operator.

For example, as shown in FIG. 4a, the handle has been moved to a lower position and FIG. 4a shows an instantaneous position of the linkage and before the seat has actually been lowered by release of the air pressure. More specifically, the handle has been moved to a lower position which causes a lost motion, spring strut 70 to pull upwardly on a floating link 73, which link has a pivot point or shaft 75 at its rear end. As will appear, this pivot point 75 is normally located in the center notch 77 of a bracket 79 which in turn is pivoted at 80 to the base frame. A tension spring 81 is connected between the pivot shaft 75 and the bracket 79 so as to bias the floating link 73 and more particularly, the pivot shaft 75 into the center notch 77 of the bracket 79.

The front end of the link 73 is connected by a pin 83 located in slot 85 of a link 86 of strut 70, thereby forming a pin and slot, lost motion connection between the front end of the bracket 73 and the link 86. The rear end of the handle 60 is likewise connected by a pin and slot, lost motion connection to the upper end of the link 86 by means of the pin 89 which extends through the slot 90 at the upper end of the link 86. A tension spring 92 urges the rear end of the handle 60 and the front end of the link 73 toward one another but yet permits them to move apart as determined by the limits imposed by the slots 85 and 90. For example, as shown in FIG. 5, the spring has acted to pull the rear end of the handle 60 and the link 73 together whereas in FIG. 7 the spring is tensioned and the rear end of the handle and floating link 73 have moved to the opposite, outer extremes of their respective slots.

FIGS. 4a and 4 show the position of the handle when it has been shifted to a downward position to thereby lower the seat from a mid-point position. More specifically, FIG. 4a is an instantaneous view of the mechanism of the handle when it has been swung to its downward position but before the seat has actually moved downwardly. The downward swinging of the handle causes strut 70 to be pulled against the bias of its spring 92 and thereby pulls the front link 73 upwardly about its pivot 75. The pin and slot connection between the floating link 73 and the valve element 50 causes the valve element to be raised and consequently permits pressurized air to be exhausted from the air bag. In this manner, the seat moves downwardly to the position determined by handle 60.

As shown in FIGS. 3a and 3, the handle has been shifted in the upper position by the operator so that the seat moves to the uppermost position, as desired by an operator. More specifically, FIG. 3a shows the control system at an instantaneous position after the handle has been shifted upwardly but before the seat has actually moved to the upper position. In that instance, it will be noted that the spring strut 70 has been pushed downwardly and the floating link 73 has been pushed downwardly and caused to pivot about its shiftable pivot point 75. Consequently, the valve element 50 moves downwardly, thereby permitting air pressure to go to the bag. This increase in pressure causes the seat to rise to the position as set by handle 60 as shown in FIG. 3.

Thus, the control mechanism of the present invention provides an infinite adjustment of the seat in either an upward or downward direction.

OSCILLATING RANGE OF SEAT MOVEMENT

FIGS. 5 and 6 show the setting of the handle in the mid-ride position. FIG. 3 shows the handle and seat in the upper ride position and FIG. 4 shows the handle and seat in the down-ride position. In any of the infinite number of settings of the handle however, the seat can resiliently oscillate in an up and down direction within a given range of movement, for example, say six and one-half inches.

FIG. 5 shows the seat suspension when in the mid-ride position, but when the seat has bounced downwardly. Under that circumstance, the valve element 50 is shifted downwardly to permit air pressure to go to the bag via conduit 44, thereby cushioning the downward movement of the seat.

FIG. 6 shows the handle in the mid-ride position, but where the seat has been caused to bounce upwardly. In that circumstance, the floating link 73 has been resiliently pulled upwardly by the spring strut 70, thereby pulling the valve element up about point 75, consequently causing air pressure from the bag to be exhausted via conduit 44 and out of the exhaust port 48 of the valve. In that manner, the upward movement of the seat has been cushioned by exhausting air pressure from the air spring 12.

The above oscillatory movement of the seat occurs during normal operating conditions and for any position of seat height that has been selected by the handle. In any setting of the handle, as the suspension oscillates in up and down directions, the valve continually deflates and inflates the bag, respectively.

Valve Protection-Extreme Seat Travel

FIGS. 7 and 8 show unusual circumstances and illustrates how the valve 42 is protected due to the floating pivot point 75 of the floating link 73.

More specifically, FIG. 7 illustrates a condition, for example, where a heavy man had been seated in the lowermost seat position (handle 60 in the lowest setting), the man has suddenly left the seat which then instantaneously raises. Under that circumstance, to prevent damage to the valve 42 due to the fact that its element 50 would be pulled excessively upwardly by the link 73 (FIG. 9), point or shaft 75 leaves its center notch 77, against the bias of the spring 81. Due to the fact that the pin 75 is thus moved downwardly along an inclined lower surface 100 of the bracket 79, the floating link 73 is then no more effective to continue pulling the valve element 50 upwardly. This disconnection prevents damage to the valve 42. Further extension is then taken up by pins 83 and 89 in slots 85 and 90 by extension of spring 92.

The valve protection feature is also illustrated in FIG. 8 which shows the position of the seat, for example, when the air has been turned off, and there is no air in the system and the seat eventually drops to its lowermost height. The seat will drop to this lowermost position regardless of the position in which the handle 60 was left. It will be noted that shaft or point 75 of the floating link 73 (FIG. 9) has been moved out of its center notch 77 against the bias of the spring 81 and along an upwardly inclined surface 112 of the bracket 79. This shifting of the pivot point again prevents the valve element 50 from being pushed excessively in a downward direction which would damage the valve.

Thus, the above described linkage provides protection for the valve when the seat reaches its maximum or minimum heights due to the floating pivot point of the floating link and which acts to in effect disconnect the valve constitutes a soft link which permits the seat to travel the remainder of its distance in the up or down direction.

A single stop, in the form of a rod 120 extending between and fixed to side walls 18 and 19, abuts against arms 24 and 22, respectively, to limit the downward and upward movement of the seat.

As shown in FIG. 2, a fluid shock absorber 130 of conventional type is pivotally connected at 131 to the seat frame and on the adjustable shaft 132 on crank 133 mounted on arm 24. This shock absorber acts in cooperative relationship with the air bag in providing a cushioning action for the seat, that is, it controls the vertical velocity of the seat. Furthermore, the shock absorber 130 acts to dampen or control the action of the air spring 12. The amount of damping action provided by the shock absorber can be varied by adjusting the throw of the shaft 133 by first loosening the hand knob 134 and thereby changing the effective length of the shock absorber by changing the position of the mounting shaft 132 for greater or less mechanical advantage.

We claim:

1. In a vehicle seat suspension mechanism for vertically, adjustably, and resiliently supporting a vehicle seat, the combination comprising; a base frame, a seat frame, means mounting said seat frame on said base frame for vertical shifting of the seat frame relative to the base frame, an air spring mounted between said seat frame and said base frame, an air valve mounted on said base frame and having a conduit connection with said air spring for conducting flow of air to and from said air spring, said air valve having means for connection to a source of air presssure; said valve also having a shiftable valve element which is shiftable between a neutral position, air spring pressurizing position, and an air spring exhaust position; a control handle mounted on said seat frame, and linkage means between said handle and said shiftable valve element; said linkage means including a floating link, a lost motion connection between said handle and one end of said floating link, said link being connected to said shiftable valve element intermediate the length of said floating link, said floating link having a pivot point at its other end, and means for mounting said pivot point of said floating link and permitting said pivot point to shift from a normal position when said seat frame assumes an extreme position in either an upper or downward direction to thereby render said valve inoperative when said seat frame is in said extreme positions.

2. The mechanism set forth in claim 1 further characterized in that said mounting means for said pivot point comprises a bracket pivotally mounted on said base frame and having a central notch for the reception of said pivot point when the latter is in its said normal position, said bracket also having a surface adjoining each of opposite sides of said notch, said pivot point adapted to bear against either of said surfaces in said extreme seat frame positions.

3. The mechanism set forth in claim 2 further including a spring between said floating link and said bracket for resiliently urging said pivot point in said central notch in said normal position of said pivot point.

4. The mechanism set forth in claim 1 further characterized in that said lost motion connection comprises a strut having a pin and slot connection with said floating link and with said handle, and also including a spring between said handle and link.

5. A vehicle seat suspension mechanism for supporting a vehicle seat and comprising; a base frame, a seat frame, means mounting said seat frame on said base frame for vertical shifting of the seat frame relative to the base frame, an air spring mounted between said seat frame and said base frame, an air valve having a conduit connection with said air spring for conducting air pressure to and from said air spring, said valve having means for connection to a source of air pressure and also having a shiftable valve element, a control handle mounted on said seat frame, and linkage means between said handle and said shiftable valve element; said linkage means including a floating link having a pivot point at one end, said link being connected to said shiftable valve element, and means for mounting said pivot point of said floating link and permitting said pivot point to shift from a normal position when said seat frame assumes an extreme position in either an upper or downward direction to thereby render said valve inoperative.

6. The mechanism set forth in claim 5 further characterized in that said mounting means for said pivot point comprises a bracket pivotally mounted on said base frame and having a central notch for the reception of said pivot point when the latter is in its said normal position, said bracket also having a surface adjoining each of opposite sides of said notch, said pivot point adapted to bear against either of said surfaces in said extreme seat frame positions.

7. The mechanism set forth in claim 6 and including a lost motion connection between said handle and said floating link.

8. The mechanism set forth in claim 7 further characterized in that said lost motion connection comprises a strut having a pin and slot connection with said floating link and with said handle, said lost motion connection including a spring between said handle and said link.

9. In a vehicle seat suspension mechanism for vertically, adjustably, and resiliently supporting a vehicle seat, the combination comprising; a base frame, a seat frame, means mounting said seat frame on said base frame for vertical shifting of the seat frame relative to the base frame, an air spring mounted between said seat frame and said base frame, an air valve mounted on said base frame and having a conduit connection with said air spring for conducting air pressure to and from said air spring, said air valve having means for connection to a source of air pressure; said valve also having a shiftable valve element which is shiftable between a neutral position, air spring pressurizing position, and an air spring exhaust position; a control handle mounted on said seat frame, and linkage means between said handle and said shiftable valve element; said linkage means including a floating link, a strut having a pin and slot connection with one end of said floating link and with said handle, and also including a spring between said handle and link, said floating link being connected to said shiftable valve element intermediate the length of said floating link, said floating link having a pivot point at its other end, and a bracket pivotally mounted on said base frame and having a notch for receiving said pivot point in a normal position, said bracket also having a surface adjoining each of opposite sides of said notch, so that said pivot point can shift from said normal position to either of said surfaces when said seat frame assumes an extreme position in either an upper or downward direction to thereby render said valve inoperative when said seat frame is in said extreme positions, a spring connected between said floating link and said bracket for resiliently urging said pivot point in said notch in said normal position of said pivot point.

10. A vehicle seat suspension mechanism for supporting a vehicle seat and comprising; a base frame, a seat frame, means mounting said seat frame on said base frame for vertical shifting of the seat frame relative to the base frame, an air spring mounted between said seat frame and said base frame, an air valve having a conduit connection with said air spring for conducting air pressure to and from said air spring, said valve having means for connection to a source of air pressure and also having a shiftable valve element, a control handle mounted on said seat frame, and linkage means between said handle and said shiftable valve element; said linkage means including a floating link having a pivot point at one end, said link being connected to said shiftable valve element, a bracket pivotally mounted on said base frame and having a central notch for the reception of said pivot point when the latter is in a normal position, said bracket also having a surface adjoining each of opposite sides of said notch, said pivot point adapted to shift from said notch and bear against either of said surfaces in extreme up or down seat frame positions to thereby prevent said valve element from excessive movement, a strut connected between said handle and said floating link and having a pin and slot connection with said floating link and with said handle, and a spring connected between said handle and said floating link.

* * * * *